US011528610B2

(12) United States Patent
Ficara et al.

(10) Patent No.: US 11,528,610 B2
(45) Date of Patent: Dec. 13, 2022

(54) DYNAMIC CONTROL AND CREATION OF USER PRIVATE NETWORKS

(71) Applicant: Cisco Technology, Inc., San Jose, CA (US)

(72) Inventors: Domenico Ficara, VD (CH); Mirko Raca, Morges (CH); Lorenzo Granai, Crissier (CH); Leo Caldarola, Morrens (CH); Roberto Muccifora, Ropraz (CH); Francisco Sedano Crippa, Le Mont sur Lausanne (CH)

(73) Assignee: CISCO TECHNOLOGY, INC., San Jose, CA (US)

(*) Notice: Subject to any disclaimer, the term of this patent is extended or adjusted under 35 U.S.C. 154(b) by 414 days.

(21) Appl. No.: 16/712,334

(22) Filed: Dec. 12, 2019

(65) Prior Publication Data
US 2021/0185533 A1   Jun. 17, 2021

(51) Int. Cl.
H04W 8/00       (2009.01)
H04L 12/28      (2006.01)
H04W 84/12      (2009.01)
H04L 9/40       (2022.01)
H04L 67/51      (2022.01)
H04W 4/02       (2018.01)
(Continued)

(52) U.S. Cl.
CPC ......... *H04W 12/086* (2021.01); *H04W 8/005* (2013.01); *H04W 12/06* (2013.01); *H04W 64/00* (2013.01)

(58) Field of Classification Search
CPC ... H04W 12/086; H04W 12/06; H04W 8/005; H04W 64/00; H04W 84/12; H04W 4/02; H04W 4/21; H04L 2012/2841; H04L 12/1708; H04L 12/1718; H04L 67/16; H04L 63/0272
See application file for complete search history.

(56) References Cited

U.S. PATENT DOCUMENTS

2009/0046644 A1    2/2009  Krishnaswamy et al.
2009/0177644 A1*   7/2009  Martinez ............ G06Q 30/0201
                                                    707/999.005
(Continued)

OTHER PUBLICATIONS

Cisco® identity Services Engine (ISE), Cisco white paper, © 2019 Cisco and/or its affiliates; dated 2019; 8 pages.
(Continued)

*Primary Examiner* — Vu V Tran
(74) *Attorney, Agent, or Firm* — Baker Botts, LLP

(57) ABSTRACT

In one embodiment, a method in a multi-tenant wireless network comprises determining a first user private network (UPN) for a first device of a first user. The first UPN provides discovery, by the first device, of other devices on the wireless network to a first subset of other devices on the wireless network. The method further comprises determining a second UPN for the first device of the first user. The second UPN provides discovery, by the first device, of other devices on the wireless network to a second subset of other devices on the wireless network. The method further comprises providing discovery of the first subset and second subset of other devices on the wireless network to the first device of the first user. Discovery of the second subset is provided dynamically based on a current location of the first device.

20 Claims, 6 Drawing Sheets

(51) Int. Cl.
*H04W 4/21* (2018.01)
*H04W 12/086* (2021.01)
*H04W 12/06* (2021.01)
*H04W 64/00* (2009.01)

(56) References Cited

U.S. PATENT DOCUMENTS

| | | |
|---|---|---|
| 2009/0201896 A1 | 8/2009 | Davis et al. |
| 2014/0112200 A1 | 4/2014 | Lor et al. |
| 2014/0181891 A1* | 6/2014 | Von Bokern .......... H04L 63/102 |
| | | 726/1 |
| 2015/0019342 A1 | 1/2015 | Gupta |
| 2015/0067163 A1* | 3/2015 | Bahnsen ............. H04W 64/003 |
| | | 709/225 |
| 2015/0304417 A1* | 10/2015 | Tan ..................... H04L 67/1095 |
| | | 707/610 |
| 2018/0359764 A1* | 12/2018 | Ong .................... H04L 12/4625 |
| 2019/0278665 A1* | 9/2019 | Raghuram .......... G06F 11/1464 |

OTHER PUBLICATIONS

PCT International Search Report with attached Written Opinion of the International Searching Authority in International Application No. PCT/US2020/070870, dated Feb. 19, 2021, 10 pages.

* cited by examiner

DYNAMIC CONTROL AND CREATION OF USER PRIVATE NETWORKS

TECHNICAL FIELD

Certain embodiments of the present disclosure relate, in general, to wireless communications systems, and, in particular, to user private networks.

BACKGROUND

User Private Networks (UPNs) or Wireless Private Networks (WPNs) are used to manage and limit device-discovery services in a multi-tenant wireless network. For example, on a university campus, UPNs may be used to limit the discovery of devices on the network to only devices an individual owns or controls. In one example, a student in a university dorm may want to stream from her smartphone to her a digital media player connected to her tv. On a large campus, there may be dozens or more such wireless devices, which results in a large list of possible devices that the student will have to comb through to find her own device to which to connect. With a UPN, the student can define (e.g., by using some interface to a Radius server) which devices belong to her, thereby limiting the scope of the discovery of devices or services.

BRIEF DESCRIPTION OF THE DRAWINGS

For a more complete understanding of the disclosed embodiments and their features and advantages, reference is now made to the following description, taking in conjunction with the accompanying drawings, in which.

DESCRIPTION OF EXAMPLE EMBODIMENTS

Overview

Figure 1:
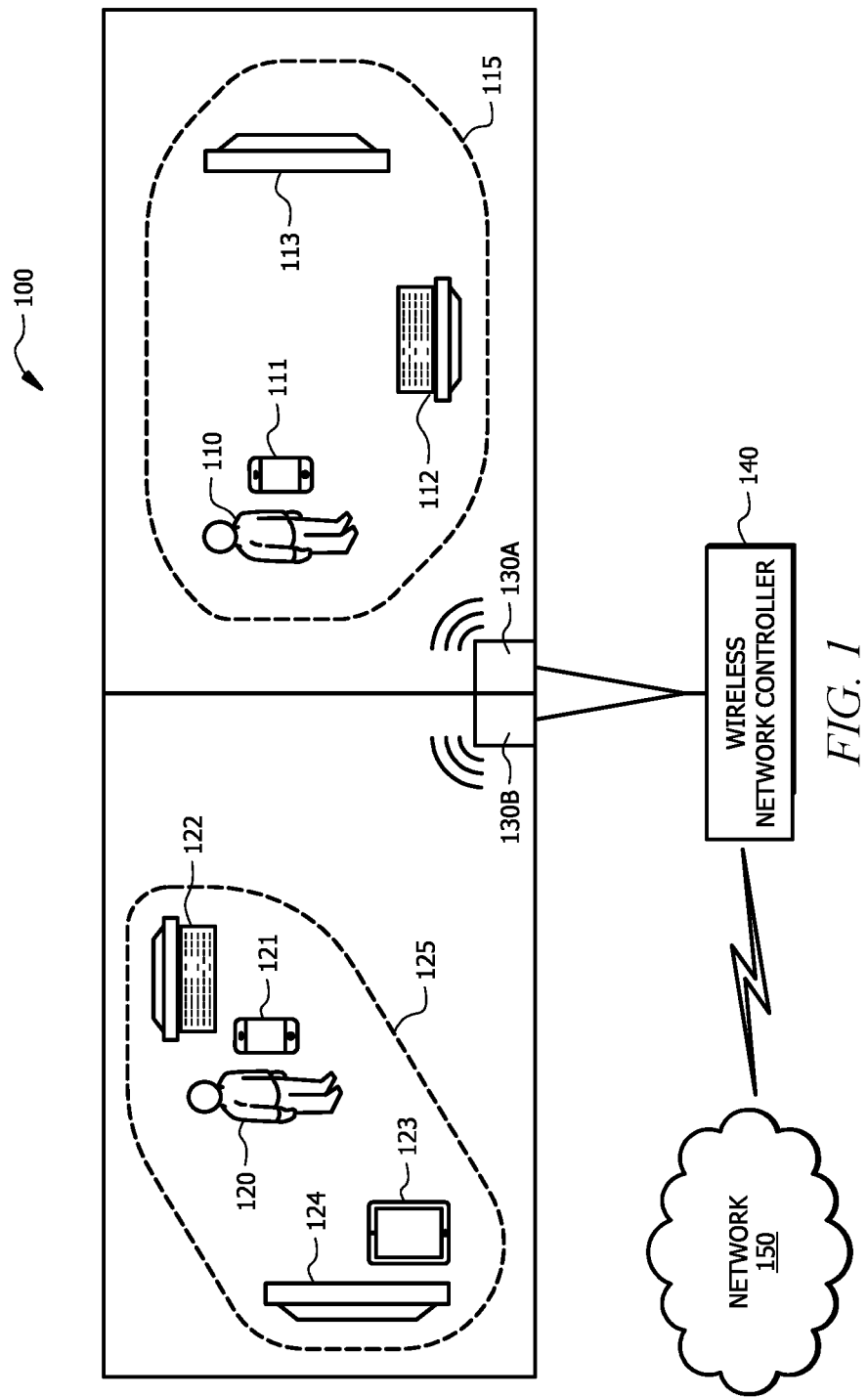
FIG. 1 illustrates an example network environment with multiple tenants covered in a shared wireless network, in accordance with certain embodiments.

According to some embodiments, a method in a multi-tenant wireless network comprises determining a first user private network (UPN) for a first device of a first user. The first UPN provides discovery, by the first device, of other devices on the wireless network to a first subset of other devices on the wireless network. The method further comprises determining a second UPN for the first device of the first user. The second UPN provides discovery, by the first device, of other devices on the wireless network to a second subset of other devices on the wireless network. The method further comprises providing discovery of the first subset and second subset of other devices on the wireless network to the first device of the first user. Discovery of the second subset is provided dynamically based on a current location of the first device.

Example Embodiments

Embodiments of the present disclosure and its advantages are best understood by referring to FIGS. 1 through 6 of the drawings, like numerals being used for like and corresponding parts of the various drawings. Although certain embodiments may be described in reference to particular illustrated examples, the disclosure herein is not limited to the particular illustrated embodiments and/or configurations and includes any and all variants of the illustrated embodiments and any and all systems, methods, or apparatuses consistent with the teachings of this disclosure, as understood by a person having ordinary skill in the art.

As described above, user private networks (UPNs) may be useful in multi-tenant wireless networks to limit discovery of devices and/or services to those relevant or controlled by the individual user. Current UPN techniques are limited and fail to address several real-world scenarios of how users move through the wireless network. For example, current techniques limit devices to one UPN per device and/or limit the UPN to a static list that is adjusted manually. However, in certain circumstances, multiple or dynamically adjusting UPNs may be extremely useful and advantageous. In particular, in the university example, a student may visit a friend in a different dorm to play video games using their devices. In this scenario, the student may want to be associated with both its personal UPN and also the UPN of her friend including the video game console. As another example, the student may want to have her smartphone in a UPN with her smartwatch and her TV, e.g., when she is in her dorm room. However, when she leaves the room, it does not make sense to keep listing the TV services on her smartphone. As yet another example, employees meeting in a conference room may bring devices that are not associated with a common UPN, thereby requiring additional steps to ensure that each device is discoverable to each other device. In each of the above scenarios, the existing techniques for UPNs and their management do not adequately address real-world use of wireless devices. Likewise, allowing the discovery of all devices and services, especially in multi-tenant or crowded network environments, inundates the user with too many potential devices and services, thereby impeding the identification of the correct service and/or device.

Described herein are solutions addressing one or more of the technical problems identified above. For example, certain embodiments provide techniques for dynamic control and creation of user private networks. As described in detail herein, one or more embodiments provided in this disclosure may include one or more technical advantages or solutions to existing technical problems. For example, certain embodiments allow for a wireless device to be associated with or have access to multiple user private networks. In this manner, different subsets of devices or services may be discoverable in different contexts, e.g., in different locations, times, or proximities to other devices. As another example, certain embodiments allow for the dynamic creation of user private networks through the learning of associations, proximity patterns, and shared characteristics between devices. In this manner, user private networks may be generated without requiring tedious set-up and management by the end-user and reflect the actual uses of those devices in the wireless network. Certain embodiments may have none, some, or all of the above-recited advantages. Other advantages may be readily apparent to one having skill in the art in light of the present disclosure.

Although the subject matter described herein may be implemented in any appropriate type of system using any suitable components, the embodiments disclosed herein are described in relation to a multi-tenant network environment, such as the example network environment 100 illustrated in FIG. 1. For simplicity, FIG. 1 illustrates an example network environment 100 with multiple tenants covered in a shared wireless network, in accordance with certain embodiments. In particular, network environment 100 includes a first user 110 and a second user 120 that are able to access a network, e.g., network 150, wirelessly though wireless access points (WAPs) 130A and 130B, respectively. For example, network environment 100 may include a university shared space (e.g., dorms), a hospital or healthcare facility, or a corporate workspace. In the particular illustrated example, first user 110 and second user 120 each connected wireless by using WAP 130A and WAP 130B, respectively. In some embodiments, the two users 110/120 may connect to the same wireless access point. In other embodiments, first user 110 and second user 120 connect to different wireless access points, such as WAP 130A and WAP 130B.

Network environment 100 may be further associated with a wireless network controller (WNC) 140 (which may be also referred to as a wireless LAN controller or network controller). In certain embodiments, WNC 140 is configured to control or configure one or more operations of WAPs 130A and 130B. For example, WNC 140 may configure access by using WAPs 130A and 130B to control who and what devices can connect to upstream and downstream network resources. Additionally, WNC 140 may be deployed to consolidate the wireless network, thereby allowing for easier upgrades and enabling advanced wireless functionality. Further, WNC 140 may be integrated with one or more network elements, such as an access switch. In certain embodiments, network environment 100 may include multiple WNCs 140 that are each connected to a core network or centralized system controlling and/or monitoring the wireless network deployment. For example, for a large university campus, many WAPs 130 and WNCs 140 may be deployed to provide access to the same network 150.

Each of first user 110 and second user 120 may control or have access to one or more wireless devices or devices having network connectivity with the same network. For example, first user 110 may have wireless devices 111-113 within her dorm room and second user may have wireless devices 121-124 within her dorm room. For example, first user 110 may have a mobile phone 111, a laptop 112, and a networked television 113. Likewise, second user 120 may have a mobile phone 121, a laptop 122, a gaming console 123, and a networked television 124. Each of the devices 111-113 and 121-124 may be connected within a shared network, e.g., network 150. The devices may be also wireless connected by using one or more of WAPs 130A/130B.

Network environment 100 may comprise and/or interface with any type of communication, telecommunication, data, cellular, and/or radio network or other similar type of system. In some embodiments, one of more of the networks in heterogenous network environment 100 may be configured to operate according to specific standards or other types of predefined rules or procedures. Thus, particular embodiments of the networks in network environment 100 may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network environment 100 may further include one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices. In certain embodiments, network environment 100 may comprise any number of wired or wireless networks, network nodes, base stations, controllers, wireless devices, relay stations, and/or any other components or systems that may facilitate or participate in the communication of data and/or signals whether by using wired or wireless connections.

As used herein, WAP 130A/130B and/or WNC 140 may refer to equipment capable, configured, arranged and/or operable to communicate directly or indirectly with a wireless device, wireless access point and/or with other network nodes or equipment in the wireless network to enable and/or provide wireless access to the wireless device and/or to perform other functions (e.g., administration) in the wireless network. For example, WAP 130A/130B and/or WNC 140 may include an access point (APs) (e.g., radio access points or WiFi APs), base stations (BSs) (e.g., radio base stations, Node Bs, evolved Node Bs (eNBs) and NR NodeBs (gNBs)).

Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, WAP 130A/130B and/or WNC 140 may be a virtual network node. More generally, however, WAP 130A/130B and/or WNC 140 may represent any suitable device (or group of devices) capable, configured, arranged, and/or operable to enable and/or provide a wireless device with access to a respective network on heterogeneous network environment 100 or to provide some service to a wireless device, such as wireless devices 111-113 and 121-124, that has accessed the wireless network.

Although wireless devices 111-113 and 121-124 are used as examples of discoverable devices according to one or more embodiments described herein, additional or different wired devices may be also discoverable. For example, a user private network may include one or more wired devices that are connected to the networked by using some non-wireless connection, e.g., a local area network connection by using an ethernet connection to a router. In this scenario, the wired devices may be associated with a location, as with wireless devices 111-113 and 121-124, which may be used in the UPN creation and management embodiments described herein. For example, the location of the wired devices may not be determined based on wireless sensing methods, as applied to determine the location of a mobile phone within a network, but may be determined by any other suitable means. The locations of the wired devices may be stored in a database or other data storage location, which is accessible to one or more systems described herein, thereby allowing the locations of the wired devices to be used to determine UPNs in a similar manner of using the locations of the wireless devices.

As used herein, wireless devices 111-113 and 121-124 may include any device capable, configured, arranged and/or operable to communicate wirelessly with network nodes and/or other wireless devices. In certain embodiments, wireless devices 111-113 and 121-124 includes a user equipment (UE) configured to communicate on an LTE or 5G NR network or a wireless access point configured to communicate according to one or more wireless standards, such as WiFi. Communicating wirelessly may involve transmitting and/or receiving wireless signals using electromagnetic waves, radio waves, infrared waves, and/or other types of signals suitable for conveying information wirelessly. In some embodiments, wireless devices 111-113 and 121-124 may be configured to transmit and/or receive information without direct human interaction. For instance, wireless devices 111-113 and 121-124 may be designed to transmit information to a network on a predetermined schedule, when triggered by an internal or external event, or in response to requests from the network.

Examples of wireless devices 111-113 and 121-124 include, but are not limited to, a wireless access point, a wireless router, a wireless repeater, a smart phone, a mobile phone, a cell phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc.

According to certain embodiments, one or more user private networks (UPNs) may be defined. As described herein, a UPN may limit the discovery of a service and/or device within a network. For example, user 110 using mobile phone 111 may discover her other devices 112 and 113 by using WAP 130A if they devices 112 and 113 are defined to be in the same UPN. For example, a first UPN 115 may be defined for user 110 and/or her devices 111-113 such that each of the first user 110's devices are discoverable to each other. As a concrete example, if first user 110 wants to mirror the screen on mobile phone 111 on the screen of television 113, he may first have to locate and select television 113 from a list of discoverable devices on the network (e.g., by using some application selection interface or network settings on mobile phone 111). First UPN 115 may limit the amount of devices and/or services that are available for such a selection. This may be advantageous by reducing the potentially numerous devices that are on a multi-tenant wireless network to only those relevant devices, e.g., those controlled or to which access is provided to first user 110. Further, first UPN 115 may limit the discoverable services available to first user 110 by using mobile phone 110. For example, some networked services available through laptop 112 may be restricted from discovery on the network, whereas other services are enabled and accessible to first user 110 within first UPN 115.

Likewise, a second UPN 125 may be defined for second user 120 and her devices 121-124. In this manner, each user may have their own UPN that restricts discovery of networked devices and/or services to a limited subset of devices and/or services on network 150 in the multi-tenant network environment 100. Although first UPN 115 and second UPN 125 may limit the discovery of some devices on network 150, first user 110 and second user 120 may still access resources outside of the defined devices and/or services on their respective UPNs. For example, in certain embodiments, connections to other networked or network-accessible devices and services may not be limited, even if the discovery of those devices and services is so limited. As discussed above, however, there are certain limitations of conventional deployments of UPNs. For example, conventional techniques limit a device or user to a single defined UPN that is static and is only changed by using manual settings changes. For example, first user 110 may be required to register each of devices 111-113 to him on a university network application for those devices to be discoverable to each other. Even with improved applications, such as web, mobile, and browser applications that enable each tenant to modify the settings of his or her UPN, the user may be limited to only a single definable UPN that requires manual updates to change which devices and/or services are included in the UPN. As will be discussed further herein, the limitations of conventional UPN deployments may inadequately address real-world scenarios for using wireless devices.

Figure 2:
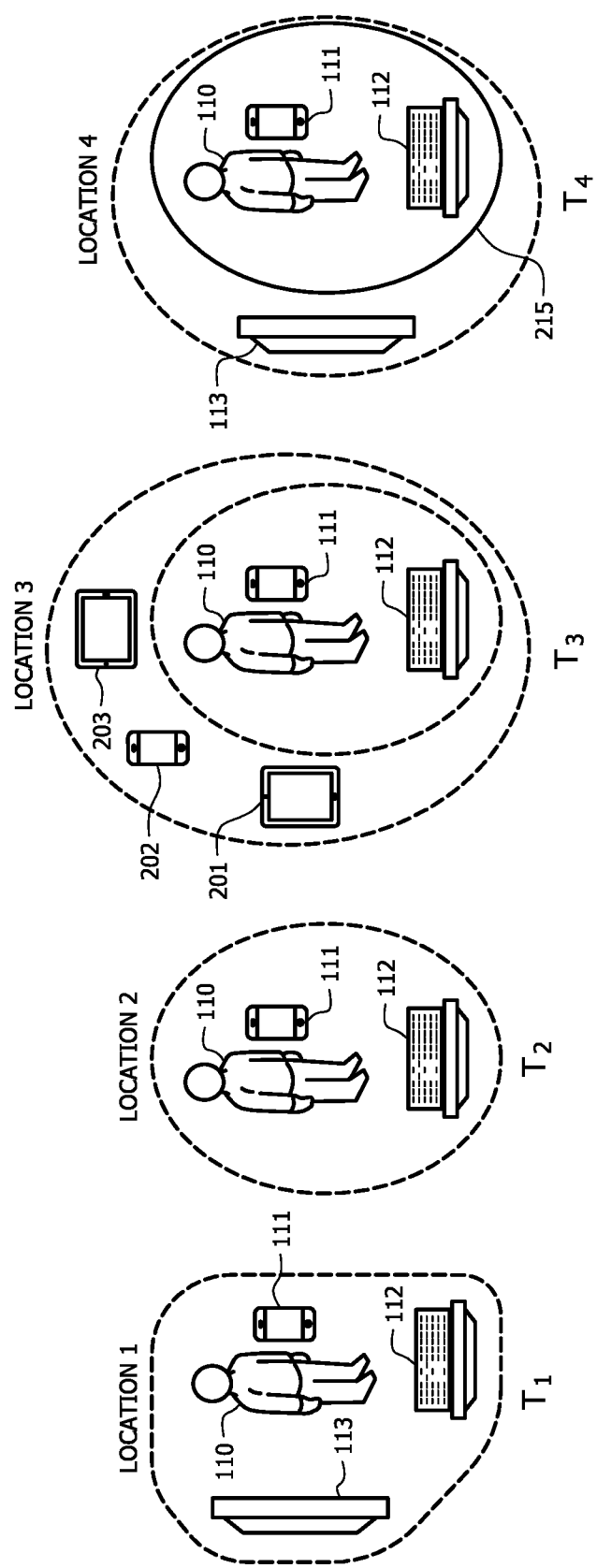
FIG. 2 illustrates an example dynamic creation of a user private network, in accordance with certain embodiments.

Certain embodiments described herein address the challenges described above. FIG. 2 illustrates an example dynamic creation of user private network 215, in accordance with certain embodiments. In certain embodiments, the location of devices on network 150 in network environment 100 may be tracked over time or at particular times. In some embodiments, WNC 140 may be configured to dynamically define and adjust UPN 215 using the tracking of the devices. For example, the location information can be used to determine if a group of connected personal devices are commonly moving together and group them as belonging to the same user. Once the devices are associated, a location-aware UPN 215 may be created or defined for the devices closely located together and belonging to the same user. In some embodiments, the location-aware UPN 215 moves with the user (and/or one or more devices, such as a mobile phone that is highly-correlated with the movement of the user) and is dynamic. For example, when the user or the particular device moves, UPN 215 may be adjusted to add or remove one or more devices from UPN 215, e.g., by using WNC 140 and/or other network elements.

FIG. 2 illustrates a particular example of how UPN 215 may be defined over a plurality of times T1-T4 at which the locations (Locations 1-4) of devices are monitored (or determined). As shown in the illustrated embodiment, first user 110 is monitored at each of T1-T4 to be located at Locations 1-4. In some embodiments, one or more of Locations 1-4 may be the same location, e.g., at first user 110's dorm room or office. Over the course of the monitoring, associations between devices and first user 110 may be determined and ultimately culminate in the creation of UPN 215.

In particular, at T1, first user 110 may be at Location 1, e.g., her room, with mobile phone 111, laptop 112, and television 113. At T2, network 150 may determine that first user 110 has moved to Location 2, e.g., a student union coffee shop, and determine that mobile phone 111 and laptop 112 are co-located, but first user 110 is no longer sharing a location with television 113. The association between mobile phone 111 and laptop 112 may be made by a network controller, such as WNC 140, alone or in conjunction with other network elements, that mobile phone 111 and laptop 112 are intended to be mutually discoverable.

At T3, first user 110 may be determined to be at Location 3, e.g., a classroom, in which other devices, such as tablets 201, 203 and mobile phone 202, are located on the wireless network. These additional devices may not be automatically grouped with mobile phone 111 and laptop 112 into UPN because they are co-located infrequently or only in locations that have a high density of wireless devices. However, in certain embodiments, WNC 140 and/or network 150 may associate the entire group of wireless devices 111, 112, 201-203 and associate wireless devices 111 and 112 as a subgroup. In this manner, all of the potential associations may be monitored for dynamically generating UPN 215.

At T4, first user 110 may be located at Location 4, which in this example may be her dorm room, in which television 113 is located. At this time, WNC 140 and/or network 150 may determine that there is sufficient correlation of the locations of wireless devices 111 and 112 with first user 110 to generate UPN 215 that includes those devices. As a result, mobile phone 111 and laptop 112 may be mutually discoverable on UPN 215 without first user 110 having to manually set up a UPN or register her devices to network 150.

Additionally, since television 113 may be co-located at a plurality of times with devices defined in UPN 215, television 113 may be later included in UPN 215, e.g., after repeated returns and location monitoring showing the overlap within first user 110's dorm room. In certain embodiments, a second UPN may be defined for first user 110 that includes a different set of devices as UPN 215. For example, the second UPN may further include television 113 and other devices that are co-located with first user 110 only in particular instances or at particular times of day in contrast with the co-location of mobile phone 111 and laptop 112 that first user 110 carries with him to other locations.

In certain embodiments, multiple UPNs may be defined with one or more overlapping devices. For example, a further UPN may be defined in addition to UPN 215 that includes mobile phone 111, laptop 112, and television 113 of first user. This further UPN may be associated with only particular locations, e.g., only with first user 110's room, whereas UPN 215 may be associated with any location or a larger number of locations (e.g., because these devices are those devices that first user 110 travels with and accesses network 150 from at different locations—classrooms, student unions, etc.). As another example, first user 110 may be associated with a sub-group or work team having access in the multi-tenant network environment 100 that includes other users. Certain devices of first user 110, such as laptop 112, e.g., a work-issued or registered device, may be associated with the sub-group or work team and also included in another UPN defined to include the work-devices of all of the sub-group or work team members. In this manner, first user 110 may be provided discovery to her teammates' devices. As described above, in some embodiments, such discovery may be location-dependent. For example, the devices on the work-team UPN may be limited to when the devices are co-located (or a threshold number of the devices are in the same location) or within certain pre-defined locations, e.g., a conference room. Additionally, other criteria may be considered when deciding whether to provide access on this further UPN, such as the time of day (e.g., restrict access to business hours) or additional security credentials or identification (e.g., a conference identification or group code, etc.). In this manner, WNC 140 and/or network 150 may provide access to multiple UPNs to users and define overlapping (or not) UPNs whose access is dynamically managed.

As a result, the set of discoverable devices and/or services by using multiple UPNs defined for a device may be determined by computing or determining a combined or resulting UPN that is the union of all applicable UPNs, e.g., based on location and/or other criteria. In particular embodiments, each UPN may be associated with a particular network identifier or range of network addresses. For example, in IPv6, an interface may be allocated multiple IPv6 addresses and each UPN may be configured to have its own subnet. In this manner, a single device may provide access to (or belong to) multiple UPNs, which may be dynamically created and/or managed as described herein.

In certain embodiments, a new wireless device may be added to UPN 215 without manually registering the device or changing the UPN settings. For example, if first user 110 obtains a new wireless device, e.g., a smart watch, the location of the new device may be monitored and associated with the movement of mobile phone 111. In response to this new association information, WNC 140 and/or network 150 may modify UPN 215 to further include the new device. Likewise, in certain embodiments, a device may be removed from UPN 215 if it is determined to no longer be associated with first user 110, e.g., due to the lack of co-location at monitored times or periods of time. In this manner, UPN 215 may be dynamically generated and may be based on the location of first user 110 and/or one of her devices, such as a primary mobile phone 111.

In certain embodiments, information other than location information may be used to define UPN 215 or dynamically manage user private networks. For example, the correlation of authentication credentials may be used to group devices together into a UPN. For example, if WNC 140 and/or network 150 knows the authentication credentials used to access network 150 by using mobile phone 111 of first user 110, if those same credentials are used to log into laptop 112, WNC 140 and/or network 150 may determine that laptop 112 is owned or controlled by first user 110 and may be included in the same UPN. Conversely, even if the location information, e.g., as described below, shows a correlation between devices at different times, if different credentials are used to access network 150, then WNC 140 and/or network 150 may determine not to include those devices in the same UPN. In this manner, location information may be combined with other information to define and dynamically manage user private networks.

Figure 3:
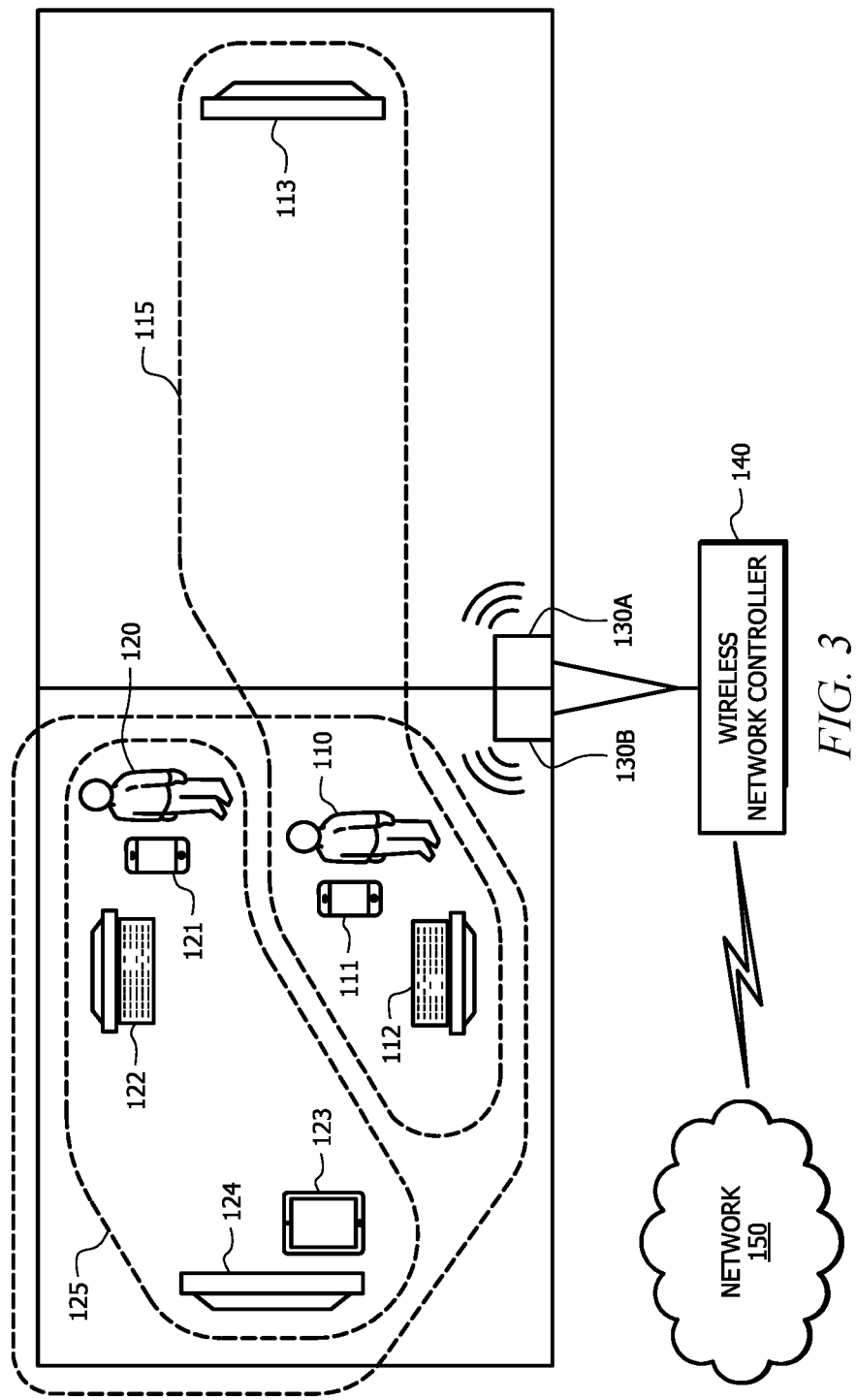
FIG. 3 illustrates an example scenario of the dynamic control of the location-based access to a user private network, in accordance with certain embodiments.

FIG. 3 illustrates an example scenario of the dynamic control of the location-based access to a user private network, in accordance with certain embodiments. Returning to the example scenario depicted in FIG. 1, first UPN 115 may be defined for devices 111-113 controlled by first user 110 and second UPN 125 may be defined for devices 121-124 controlled by second user 120. As described above, conventional techniques limit a single UPN for each user or sets of devices, which is inadequate to address the real-world scenarios in which wireless devices are used in multi-tenant network environments, such as network environment 100. FIG. 3 illustrates first user 110 visiting the room of second user 120 which is covered by the same network 150, by using WNC 140, in network environment 100. Although depicted as a next door neighbor, second user 120's room may be located in a different floor, location, or building. For example, second user 120 and her devices 121-124 may access network 150 by using a different wireless access point, e.g., WAP 130B, than used by first user 110 and her devices 111-113 when located in her room.

In this particular illustrated example, first user 110 moves to a second location proximate second user 120 and second user 120's devices 121-124. Before moving, first user 110 had access to first UPN 115 by using one or more of first user 110's devices 111-113. Now, having moved to the new location, first user 110 may be proximate to devices 121-124 which are part of second UPN 125 while also bringing along her mobile phone 111 and laptop 112 to the second location. First user 110 may still have access to first UPN 115, but may also desire access to one or more devices of second user 120 and/or services on said devices. For example, if first user 110 is visiting second user 120 and wishes to play a video game on second user 120's console 123 or watch access second user 120's television 124 to share a video from mobile phone 111, then first user 110 may be required to discover those devices in order to access them to interact or control those devices.

In certain embodiments, first user 110 is provided access to second UPN 125 and/or certain devices within second UPN 125. In some embodiments, first user 110 further maintains access through first UPN 115 and the devices and/or services thereon. In this manner, first user 110 may be provided discovery not only to devices of first UPN 115, but also devices in second UPN 125, based on a location of first user 110 and/or a device, such as mobile phone 111, of first user 110. In particular, the devices and/or services discoverable by mobile phone 111 may include not only the devices in first UPN 115, e.g., television 113 and laptop 112, but also include at least some devices in second UPN 125, e.g., video game console 123 and television 124. In some embodiments, first user 110 may be provided discovery of all devices in second UPN 125.

In certain embodiments, the dynamic control of the access of first user 110 to second UPN 125 or certain devices thereof is managed by WNC 140 and/or additional network elements providing access to network 150. For example, WNC 140 may control access to one or more user private networks based on a variety of inputs, such as those described above in the generation of UPNs and the location tracking of first user 110 and her devices. WNC 140 may accomplish at least some of these techniques by having individual profiles or configuration settings for each user, device, sets of devices, or UPNs such that WNC 140 may automatically associate a user with one or more UPNs or devices on UPNs. In certain embodiments, discovery is controlled by comparing locations of users and devices associated with UPN(s) not associated with the user and determining if those devices are within a predetermined distance of the user (or a device of the user). In this manner, the engagement of new UPNs and devices for discovery may be limited by physical distance, which may be adjusted based on a variety of factors, such as the density of the users, the particular location visited by the user (e.g., a dorm room vs. a classroom or a conference room vs. an individual office). The configuration and settings may be controlled by an operator of the multi-tenant wireless network, may be preconfigured, or may be automatically adjusted, e.g., due to machine learning or other reinforcement mechanisms. As a result, first user 110 may have a seamless experience sharing media content and games without having to set up manually a UPN or manually configure an existing UPN to include first user 110 and her devices 111-113 for their meeting.

Additionally, in certain embodiments, to avoid unwanted grouping or discovery of devices/services, each user may be able to decide or control one or more of his/her own policies for allowing other users into their defined UPN. For example, in some embodiments, second user 120 may communicate with WNC 140 to set criteria for when or who may be provided access to second UPN 125. Additionally, in some embodiments, second user 120 may also limit which devices and/or services on second UPN 125 may be discoverable to other users even if the other users are allowed discovery on second UPN 125. In this manner, a user may still exert control over access and discovery of his or her devices and services within the dynamic control techniques described herein.

Additional variations and optional features are further contemplated herein. For example, in certain embodiments, the access to second UPN 125 may be determined not only by the location of first user 110 proximate to a location associated with UPN 125, but also based on whether a particular device, such as mobile phone 121 is co-located with that location. In this manner, the presence of second user 120 may be a pre-requisite or factor in determining whether to allow first user 110 access to second UPN 125. In particular, second user 120 may not desire her devices in her dorm room to be accessible or discoverable to other users when he is gone, e.g., mobile phone 121 is with him at another location.

Additionally, although the example depicted refers to students in a door room or university environment, it is also contemplated that at least certain embodiments are applicable to any multi-tenant wireless environments, such as in a hospital, school, workplace, etc. For example, the techniques described in the meeting of first user 110 and second user 120 may be applied for the situation of a group of employees who meet in a conference room for a work meeting, in which it would be useful to easily discover and access devices in the room.

As described above, users may be given the flexibility to allow onboarding of other users in their own UPN. In certain embodiments, user may do so using one or more criteria or settings by using one or more user-defined policy. For example, some users might be more willing to allow other users into their own UPN, while others might want to limit access to specific scenarios or conditions. In particular, one user might decide to unconditionally allow another user into her own UPN but only if the other devices are inside the room with a very high probability and not proximate a shared wall of the room. Another user might decide, instead, to be notified and asked if she wants to allow in a certain user who is detected to be close by. Additionally, another user might decide to not receive any notification and only explicitly allow people to join her UPN by using a user interface (e.g., an app, web interface, etc.). In this example, she would have full flexibility to allow someone on the UPN when desired and in some embodiments, only during certain parts of the day or according to one or more other conditions.

Figure 4:
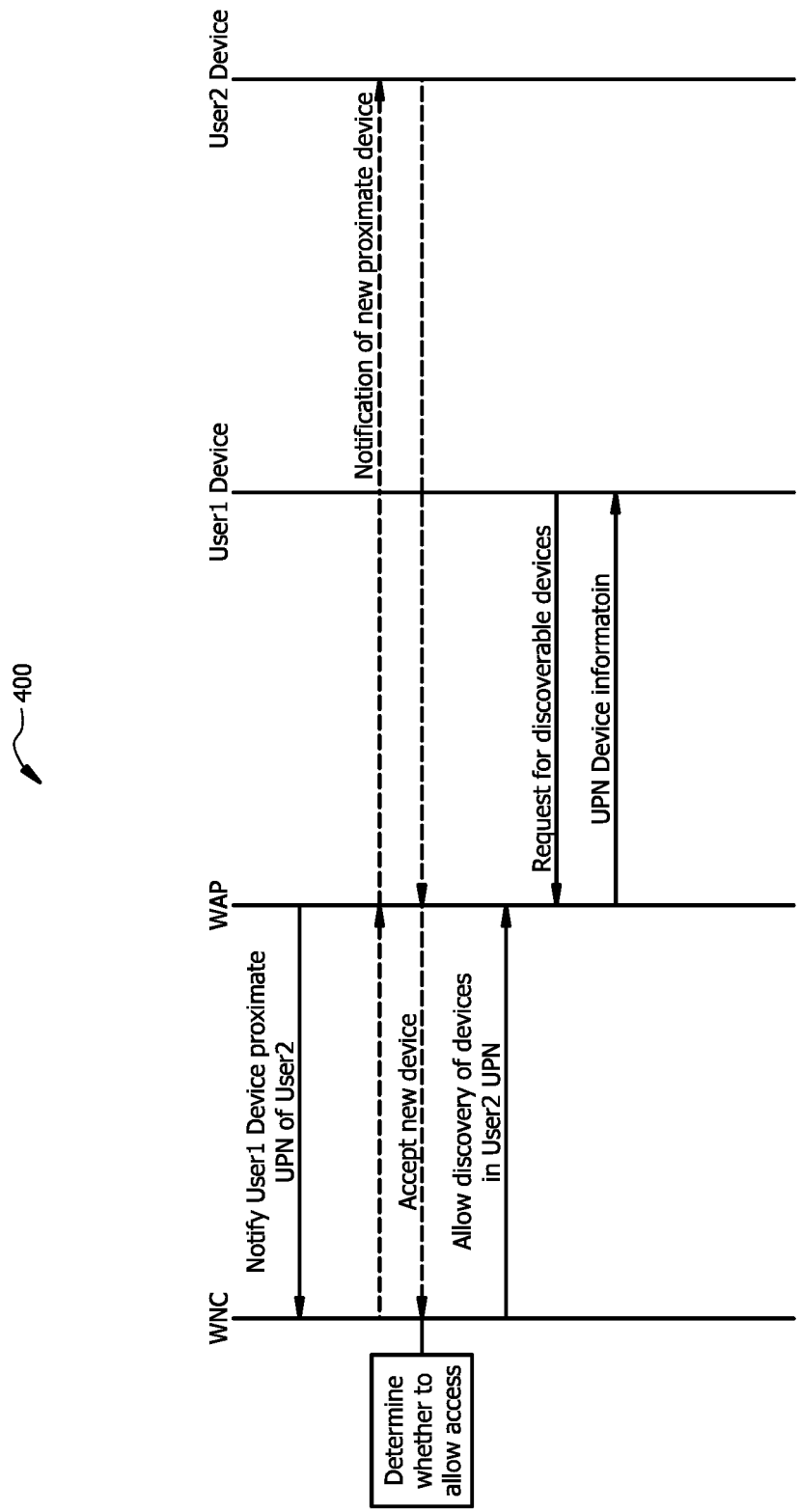
FIG. 4 illustrates an example pseudo-signaling diagram between a wireless network controller, a wireless access point, and at least one user device, in accordance with certain embodiments.

FIG. 4 illustrates an example pseudo-signaling diagram 400 between a wireless network controller, e.g., WNC 140, a wireless access point, e.g., WAP 130A or WAP 130B, and at least one user device, e.g., one or more of first user 110's devices 111-113 and/or one or more of second user 120's devices 121-124, in accordance with certain embodiments. For example, diagram 400 may illustrate certain embodiments of signaling and/or communications between said devices when first user 110 becomes in proximity to second user 120, e.g., as illustrated in the example of FIG. 3. Although this example is used to describe certain new and improved techniques, the described techniques may be further applicable to other environments and/or scenarios, such as meetings at a workplace or interactions on a hospital campus or other enterprise situation involving a multi-tenant wireless network.

Diagram 400 includes communications between a wireless network controller and a wireless access point serving one or more wireless devices. In response to determining that a first user's device, e.g., mobile phone 111 of first user 110, is proximate to the UPN of another user, e.g., UPN 125 or one or more devices included in that UPN, e.g., mobile phone 112 of second user, etc., the WAP may notify the WNC that the first user device is now proximate to the UPN of the second user, e.g., based on a threshold distance determination or other method of location within the multi-tenant network coverage locations. In certain embodiments, the WNC may determine whether to provide access to the UPN based on the proximity. For example, the WNC may consider whether there are any additional considerations or conditions that should apply to the UPN before being shared, or if there are limitations in the sharing of the UPN, e.g., only a subset of devices is discoverable, etc.

In some embodiments, as described above, the WNC may notify the second user or the user in control of the UPN that a new device and/or user is proximate to his UPN. The notification may be communicated by using the network, e.g., by using the WAP, or any other suitable communication method, e.g., by using a cellular message or by using a smartphone or computer application. In some embodiments, the notification is provided as mere notice and no further action is required by the second user before access to the UPN is provided to the first user device. In other embodiments, the WNC may require approval to share the UPN (or one or more devices thereon) to the first user. For example, the second user may use a device to send an acceptance of the first user device to have access to the UPN. In particular, the second user may receive a notification including details of the first user device and assess whether it is owned by someone she knows or if it was expected (e.g., her friend asked her to connect to her smart tv to show her a video, etc.). In some embodiments, the acceptance may be sent to the WNC, and in some embodiments, through the WAP. For example, second user's mobile phone may include an application through which the second user may receive notifications and control access to her UPN. The application may also provide a mechanism for sending the approval (or denial) of access, e.g., using the wireless connectivity or other network connectivity.

If the WNC determines to disallow access to the UPN, the devices on the UPN may not be discoverable by the first user device. In some embodiments, a notification may be sent to the second user that a device requested access to the UPN. In some embodiments, the notification that the first user device is proximate is only sent if requested by the first user. For example, when the first user device becomes proximate to the UPN of the second user, the first user may receive a notification that additional devices may be discoverable. The notification may also include a confirmation to request access, e.g., through a phone or computer application. In this manner, the first user may exert some control over whether additional devices are discoverable by her devices.

If, however, the WNC determines to allow access to second user's UPN, the WNC may signal to the WAP covering the first user device to allow discovery within the second user UPN (or specify one or more devices that should be discoverable). In certain embodiments, this may include the signaling to the WAP of the identifications of the devices that are now discoverable by the first user device, which may further include the identification of the first user device. Additionally, certain conditions or criteria may be provided in the signaling to the WAP. For example, the access to the second user UPN may be limited in time or by the physical location of the first user device. For example, if the access may be limited to when first user device is covered by the same WAP or remains in the same physical location (within some predetermined distance) or only for a set period of time unless renewed (e.g., by using further requests/approval). In this manner, the WNC may manage the access to UPNs controlled by other users in a seamless manner.

In certain embodiments, the first user device may request the discovery of nearby or accessible devices and/or services. This may include a request to the WAP serving the first user device. In response, the WAP may provide the identities and discovery of not only devices within first user's UPN, but also the one or more devices in the second user UPN based on the earlier signaling and access determination. For example, the WAP may forward the network address, e.g., IP addresses, or other identifying information, e.g., a MAC address or user-defined name of the device, of the discoverable devices and/or services to the first user device in response to a query by using an application on the first user device. As a specific example, the first user may use her mobile phone to stream music on a networked speaker system of the second user. The first user may open a music application on the phone and request to stream to a connectable device. This may trigger a request to the wireless network, e.g., by using the WAP, to provide accessible or discoverable devices. If the networked speaker system was included in the second user UPN for which access was allowed, the first user may see the speaker system in the list of available devices for streaming music over through the music application. As a result, the wireless network, e.g., by using the WNC and the WAP, may dynamically control access to UPNs and allow devices to be involved with multiple UPNs based on the relative locations of users and/or their devices.

Although certain signaling or communications are depicted in signaling diagram 400, additional or other signaling may be present during the access determination and discovery process. For example, additional signaling may be present to determine the locations of the first user device and other devices on the network. Additional signaling may be further involved with respect to communications between the WNC and other network elements, such as one or more databases, servers, wireless access points, and other controllers on the same network plane or across different network planes. For example, the WNC may communicate with other network elements to determine the properties of the second user UPN, the devices thereupon, any conditions or criteria for accessing the UPN, etc. Accordingly, although certain signaling and communications are explicitly shown in the specific illustrated example, other signaling or communications between the involved devices or network equipment may be involved, including communications known to person having ordinary skill in the art for communication between such devices and/or network equipment.

Figure 5:
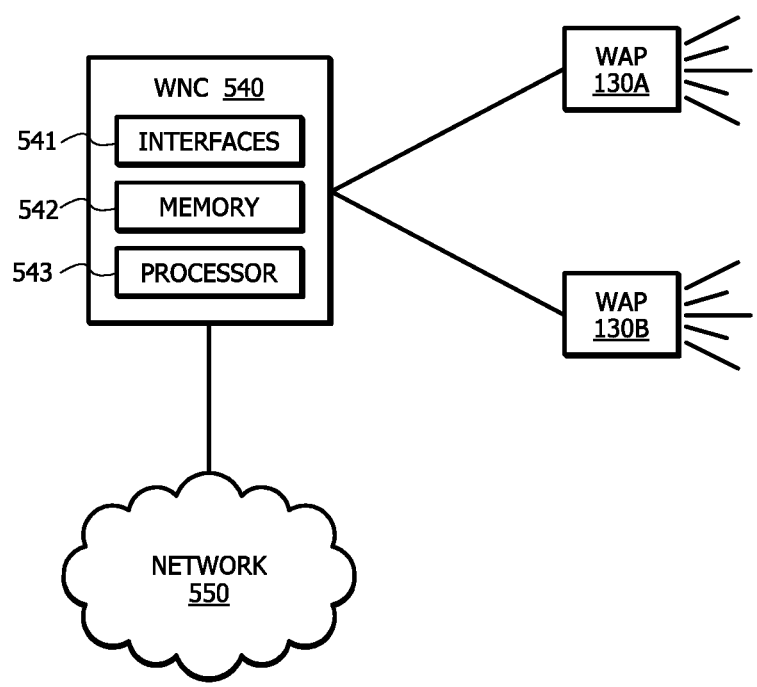
FIG. 5 illustrates a first configuration of a wireless network including a wireless network controller, in accordance with certain embodiments.

FIG. 5 illustrates a first configuration of a network 550 including wireless network controller (WNC) 540 communicatively coupled to one or more wireless access points 130A and 130B. According to certain embodiments, WNC 540 may be configured to carry out one or more of any of the above-described functionality and/or techniques relating to the dynamic creation/management and/or access control of user private networks (UPNs), e.g., as described above with respect to WNC 130 and the WNC of FIGS. 2 and 4. For example, in some embodiments, WNC 540 may include memory 542, processors 543, and one or more interfaces 541, which may be used to implement one or more functions of WNC 540.

For example, WNC 540, using one or more of interfaces 541, memory 542, and processors 543, may be configured to determine the definition of UPNs, e.g., by using location tracking, and control access of devices to other UPNs. In particular, WNC 540 may be implemented in a multi-tenant wireless environment to provide access to network 550 by using the one or more WAPs 130A and 130B. In this manner, WNC 540 may be configured to implement one or more of the described techniques for providing seamless wireless connectivity across UPNs and other wireless devices in the network. Additionally, WNC 540 may be communicatively coupled to wireless devices, such as first user 110's devices 111-113 and/or second user 120's devices 121-124 in order to carry out the management of access and determination of UPNs, according to the various embodiments described herein.

As described above, in certain embodiments, WNC 540 includes memory 542, processors 543, and one or more interfaces 541. In some embodiments, WNC 540 may include multiple sets of one or more of the illustrated components for different wireless technologies supported by WNC 540, such as, for example, GSM, WCDMA, LTE, NR, WiFi, WiMAX, or Bluetooth wireless technologies, just to mention a few. These wireless technologies may be integrated into the same or different chips or set of chips as other components within WNC 540.

Interfaces 541 may include one or more antennas or antenna arrays, configured to send and/or receive wireless signals. In certain alternative embodiments, interfaces 541 may not include an antenna, but may include an interface for interfacing with an external antenna connectable to WNC 540 through one of interfaces 541. Interfaces 541 and/or one or more of processors 543 may be configured to perform any receiving or transmitting operations described herein as being performed by WNC 540. Any information, data and/or signals may be received from a network node and/or another wireless node.

In certain embodiments, interfaces 541 includes one or more of radio front end circuitry and an antenna. For example, interfaces 541 may include one or more filters or amplifiers that is connected to transmission components. In some embodiments, interfaces 541 are configured to receive analog or digital data that is sent out to other nodes or terminal devices by using a wireless connection. In some embodiments, interfaces 541 may include circuitry configured to convert data from digital to analog and vice versa. Signals and data received may be passed to processors 543. Accordingly, interfaces 541 may include any suitable interfacing components for receiving and/or transmitting wireless communications. In certain embodiments, interfaces 541 may also include one or more interfaces for communicating between different components of WNC 540.

Processor 543 may include be any electronic circuitry, including, but not limited to microprocessors, application specific integrated circuits (ASIC), application specific instruction set processor (ASIP), and/or state machines, that communicatively couples to memory 542 and controls the operation of WNC 540. Processors 543 may be 8-bit, 16-bit, 32-bit, 64-bit or of any other suitable architecture. Processors 543 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processors 543 may include other hardware and software that operates to control and process information.

In certain embodiments, Processors 543 executes software stored on memory, to perform any of the functions described herein. For example, processor 543 may control the operation and administration of WNC 540 by processing information received from memory 542, or any external databases, or any other components in the network 550 or other network to which WNC 540 belongs. In certain embodiments, processors 543 may be configured to carry out one or more functions of WNC 540 or any components thereof. Processors 543 may include a programmable logic device, a microcontroller, a microprocessor, any suitable processing device, or any suitable combination of the preceding. Processors 543 is not limited to a single processing device and may encompass multiple processing devices.

In certain embodiments, processors 543 includes one or more of wireless transceiver circuitry, wireless signal processing circuitry, and application processing circuitry. In other embodiments, the processors 543 may include different components and/or different combinations of components. In certain embodiments processors 543 includes a system on a chip. In some embodiments, processors 543 or components thereof may be on a single chip, separate chips, or a set of chips.

Memory 542 may store, either permanently or temporarily, data, operational software, or other information for processors 543. In certain embodiments, memory 542 may store associations of UPNs with the devices contained therein, credentials associated with each user and the devices on which those credentials have been used to access network 550, or any other information used in managing the creation/revisions of UPNs and access thereto. Memory 542 may include any one or a combination of volatile or non-volatile local or remote devices suitable for storing information. For example, memory 542 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 542, a disk, a CD, or a flash drive.

In certain embodiments, memory 542 may be operable to store a computer program, software, an application including one or more of logic, rules, code, tables, etc. and/or other instructions capable of being executed by processors 543. In particular embodiments, the software may include an application executable by processors 543 to perform one or more of the functions described herein. In certain embodiments, memory 542 may be or implemented as a NoSQL database. In some embodiments, processors 543 and memory 542 may be considered to be integrated.

In certain embodiments, some or all of the functionality described herein as being performed by WNC 540 (or WNC 140) may be provided by processors 543 executing instructions stored on memory 542, which in certain embodiments may be a computer-readable storage medium. In alternative embodiments, some or all of the functionality may be provided by processors 543 without executing instructions stored on a separate or discrete device readable storage medium, such as in a hard-wired manner. In any of those particular embodiments, whether executing instructions stored on a device readable storage medium or not, processors 543 can be configured to perform the described functionality.

Processors 543 may be configured to perform any determining, calculating, or similar operations (e.g., certain obtaining operations) described herein as being performed by WNC 540 (and WNC 140). These operations, as performed by processors 543, may include processing information obtained by processors 543 by, for example, converting the obtained information into other information, comparing the obtained information or converted information to information stored by WNC 540 (and WNC 140), and/or performing one or more operations based on the obtained information or converted information, and as a result of said processing making a determination.

In particular embodiments, one or more functions described herein relating to network environment 100 including WNC 140, WAPs 130A and 130B, and network 150, referred to in FIGS. 2-4 may be implemented using one or more interfaces 541, memory 542, and processors 523, their equivalents, or any suitable combination of hardware and software as understood by persons having skill in the art capable of carrying out one or more functions or methods described herein.

Figure 6:
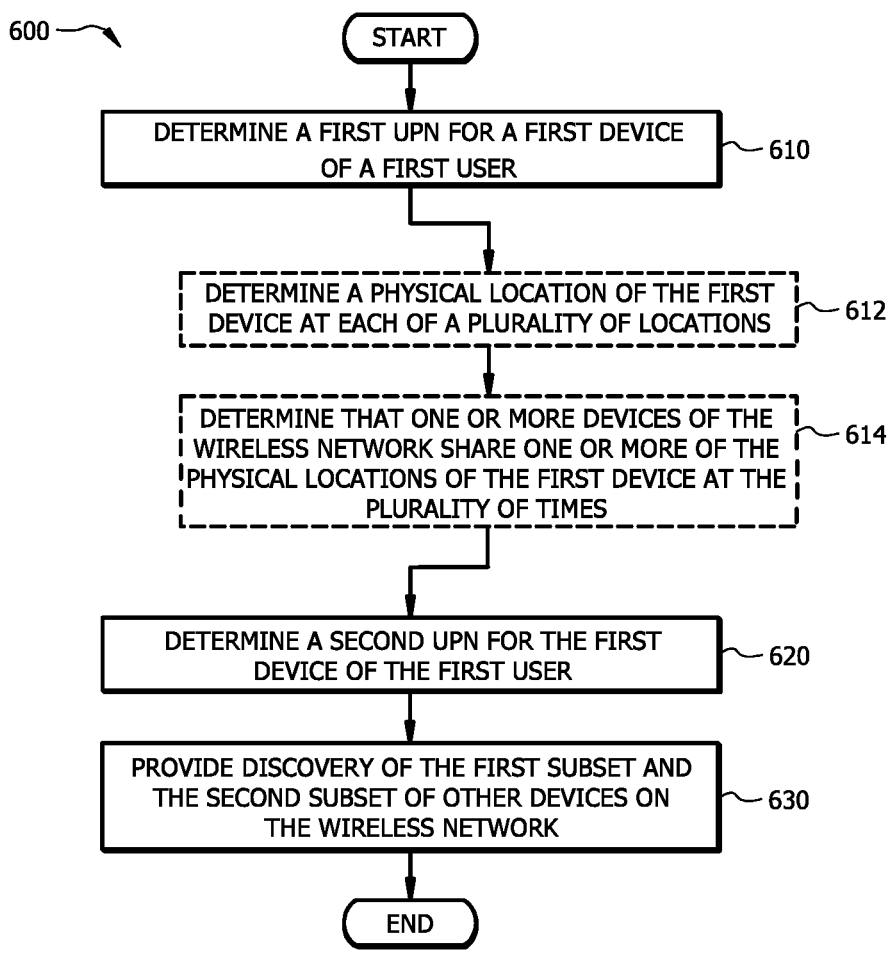
FIG. 6 is a flowchart diagram of an example method in a wireless network controller for handling user private networks, in accordance with certain embodiments.

FIG. 6 is a flowchart diagram of an example method 600 in a wireless network controller, e.g., WNC 140, WNC 540 and/or the wireless network controller(s) described in reference to FIGS. 1-5, for handling user private networks (UPNs), in accordance with certain embodiments. Method 600 may start at step 610, in which a first UPN, e.g., first UPN 115 or UPN 215, is determined for a first device of a first user. The first UPN provides discovery, by the first device, of other devices on the wireless network to a first subset of other devices on the wireless network. For example, the first device may discover devices on the same wireless network within the first UPN, of which it may also be also included. For example, the first UPN may be determined based on what devices belong to the same user as the first device, e.g., by using location tracking, security credentials, registration, etc. The first device may be limited to discovering devices that are included in the first UPN, any other UPN of which the first device is included, and any other UPN for which access is determined for the wireless device.

At step 620, a second UPN for the first device of the first user is determined. The second UPN provides discovery, by the first device, of other devices on the wireless network to a second subset of other devices on the wireless network. In certain embodiments, the second UPN may be determined to include the first device, e.g., as a second UPN associated with a different cluster of devices at a second location. In this manner, the first device may have discovery access to each device across both UPNs. In certain embodiments, the second UPN may include other devices, but not include the first device. For example, the second UPN may be similar to second UPN 125 of FIG. 1, which is defined with respect to another user. Even though it may be defined with respect to another user, it may still provide access to the second subset of devices to the first device.

At step 630, discovery of the first subset and second subset of other devices on the wireless network is provided to the first device of the first user. In certain embodiments, discovery of the second subset is provided dynamically based on a current location of the first device. For example, the second UPN may be location dependent based on the location of the first device. As a specific example, the access to the second UPN may be based on the proximity of the first device to another device in the second UPN, such as in the scenario shown in FIG. 3. As another example, the second UPN may be accessible by using the location of the first device even both UPNs are associated only with the first user. For example, the second UPN may include devices that the first user does not carry with them throughout the day, whereas the first UPN includes only the mobile devices. As yet another example, the UPNs may be defined differently based on whether the devices are work-issued or personal devices. In this manner, the discovery of devices may be managed by providing flexible, multiple UPNs through which the first device may discover devices based at least on its location in a multi-tenant wireless environment, such as a university campus or enterprise setting.

Modifications, additions, or omissions may be made to method 600 depicted in FIG. 6. Method 600 may include more, fewer, or other steps. For example, method 600 may include any further step describing one or more of the techniques or portions thereof described above in reference to FIGS. 1-5. As another example, in certain embodiments, method 600 includes one or more further optional steps 612 and 614. In certain embodiments, the determination of the first subset of other devices associated with the first UPN includes substeps 612 and 614. At step 612, a physical location of the first device is determined at each of a plurality of times. For example, mobile phone 111 of first user 110 may be monitored over time and the locations measured and/or obtained at a plurality of times (e.g., according to predetermined intervals or in response to movement of the device, etc.). See above the description in reference to FIG. 2 for further examples of how the position of the first device may be tracked over time.

At step 614, it is determined that one or more of the other devices on the wireless network are proximate at one or more of the physical locations of the first device at the plurality of times. The first subset includes the one or more of the other devices. For example, laptop 112 of first user 110 may be determined to be at each of location 1, 2, 3, and 4, of first user 110 at times T1, T2, T3, and T4, respectively. As a result, UPN 215 may be determined to include laptop 112 in addition to mobile phone 111. In this manner, the UPNs may be dynamically created and/or adjusted to include (or remove) devices that are associated with the same user or in close proximity on a regular basis. The triggering of including a device in the UPN may be based on a predetermined number of times the locations overlap at the measured times (or time periods) or by any other suitable criteria, which may be defined by the network operator and/or by the user.

Additionally, steps may be performed in parallel or in any suitable order. While discussed as a wireless network controller, such as WNC 140, WNC 150 and those described in FIGS. 1-5 as performing certain steps, any suitable component of described WNCs and other network elements involving the WNC and the wireless network, e.g., network 150, may perform one or more steps of the methods. Additionally, method 600 may include any suitable step to carry out any of the described functions of the WNCs and/or network described herein. Further, any of steps of method 600 may computerized and/or carried out using hardware, such as processors 543 of WNC 540, or any other suitable system implementing one or more components of and the WNCs described in reference to FIGS. 1-5.

Although wireless devices, nodes, access points, and controllers are described herein with reference to their use in particular wireless environments, e.g., wireless networks using the WiFi standard or radio networks such as an LTE or 5G NR network, the techniques and technical improvements thereof are also applicable to any suitable environment where native support for existing voice calls is not supported in a network onto which an existing voice call is considered for handover.

In addition, techniques, systems, subsystems, and methods described and illustrated in the various embodiments as discrete or separate may be combined or integrated with other systems, modules, techniques, or methods without departing from the scope of the present disclosure. Other items shown or described as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The invention claimed is:

1. A wireless network controller in a multi-tenant wireless network, the wireless network controller comprising:
   one or more interfaces configured to send and receive wireless transmissions;
   a memory comprising instructions; and
   a hardware processor;
   wherein the wireless network controller, when executing the instructions at the hardware processor, is configured to:
      determine a first user private network (UPN) for a first device of a first user, wherein the first UPN provides discovery, by the first device, of other devices on the wireless network and the first device is configured to connect to a first subset of the other devices on the wireless network;
      determine a second UPN for the first device of the first user, wherein the second UPN provides discovery, by the first device, of other devices on the wireless network and the first device is configured to connect to a second subset of the other devices on the wireless network; and
      providing discovery of the first subset and second subset of the other devices on the wireless network to the first device of the first user;
      wherein discovery of the second subset is provided dynamically based on a current location of the first device.

2. The wireless network controller of claim 1, wherein determining the first subset comprises:
   determining a physical location of the first device at each of a plurality of times; and
   determining that one or more of the other devices on the wireless network are proximate at one or more of the physical locations of the first device at the plurality of times;
   wherein the first subset includes the one or more of the other devices.

3. The wireless network controller of claim 1, wherein determining the first subset comprises:
   determining the credentials used by the first user to access the wireless network by using the first device;
   comparing the credentials to other credentials supplied by using the other devices to access the wireless network; and
   determining the first subset as the one or more of the other devices having credentials matching the credentials used by the first user.

4. The wireless network controller of claim 1, wherein determining the second subset comprises:
   determining the movement of the first device to a physical location comprising one or more other devices on the wireless network different from the other devices in the first subset; and
   determining the second subset to include at least the different one or more devices on the wireless network.

5. The wireless network controller of claim 4, wherein the second subset is automatically determined based on the movement of the first device to the physical location.

6. The wireless network controller of claim 4, wherein:
   a third UPN is previously determined to include the different other devices at the physical location to which the first device moves; and
   the second subset is determined to include the other devices in the third UPN and devices in the first subset located at the physical location to which the first device moves.

7. The wireless network controller of claim 6, wherein the second subset is determined to include the different one or more devices of the third UPN in response to a request to allow access to the third UPN sent by a user having control of the third UPN.

8. The wireless network controller of claim 7, wherein the wireless network controller is further configured to, before determining the second subset:
   sending a notification to a device of a second user in response to the movement of the first device to the physical location; and
   receiving a confirmation from the second user device to allow access to the third UPN.

9. The wireless network controller of claim 1, wherein determining the second UPN comprises:
   determining a set of devices controlled by a predetermined set of individuals associated with the first user;
   determining the location of the first device is within a threshold distance to one or more individuals within the predetermined set of individuals; and
   including the set of devices controlled by the one or more individuals within the predetermined set of individuals in the second subset of other devices on the wireless network.

10. The wireless network controller of claim 1, wherein the wireless network controller is further configured to change the first UPN based on physical proximity of the other devices on the wireless network in the first subset to the first device of the first user.

11. A method in a multi-tenant wireless network, the method comprising:
   determining a first user private network (UPN) for a first device of a first user, wherein the first UPN provides discovery, by the first device, of other devices on the wireless network and the first device is configured to connect to a first subset of the other devices on the wireless network;
   determining a second UPN for the first device of the first user, wherein the second UPN provides discovery, by the first device, of other devices on the wireless network and the first device is configured to connect to a second subset of the other devices on the wireless network; and
   providing discovery of the first subset and second subset of other devices on the wireless network to the first device of the first user;
   wherein discovery of the second subset is provided dynamically based on a current location of the first device.

12. The method of claim 11, wherein determining the first subset comprises:
   determining a physical location of the first device at each of a plurality of times; and determining that one or more of the other devices on the wireless network are proximate at one or more of the physical locations of the first device at the plurality of times;

wherein the first subset includes the one or more of the other devices.

13. The method of claim 11, wherein determining the first subset comprises:

determining the credentials used by the first user to access the wireless network by using the first device;

comparing the credentials to other credentials supplied by using the other devices to access the wireless network; and determining the first subset as the one or more of the other devices having credentials matching the credentials used by the first user.

14. The method of claim 11, wherein determining the second subset comprises:

determining the movement of the first device to a physical location comprising one or more other devices on the wireless network different from the other devices in the first subset; and determining the second subset to include at least the different one or more devices on the wireless network.

15. The method of claim 14, wherein the second subset is automatically determined based on the movement of the first device to the physical location.

16. The method of claim 14, wherein:

a third UPN is previously determined to include the different other devices at the physical location to which the first device moves; and the second subset is determined to include the other devices in the third UPN and devices in the first subset located at the physical location to which the first device moves.

17. The method of claim 16, wherein the second subset is determined to include the different one or more devices of the third UPN in response to a request to allow access to the third UPN sent by a user having control of the third UPN.

18. The method of claim 17, further comprising, before determining the second subset:

sending a notification to a device of a second user in response to the movement of the first device to the physical location; and receiving a confirmation from the second user device to allow access to the third UPN.

19. The method of claim 11, wherein determining the second UPN comprises:

determining a set of devices controlled by a predetermined set of individuals associated with the first user;

determining the location of the first device is within a threshold distance to one or more individuals within the predetermined set of individuals; and including the set of devices controlled by the one or more individuals within the predetermined set of individuals in the second subset of other devices on the wireless network.

20. The method of claim 11, further comprising changing the first UPN based on physical proximity of the other devices on the wireless network in the first subset to the first device of the first user.

* * * * *